Sept. 28, 1965   D. O. EASTERLY ETAL   3,208,363
AUTOMATIC FILM SENSITIVITY COMPENSATION
Filed May 11, 1964   3 Sheets-Sheet 1
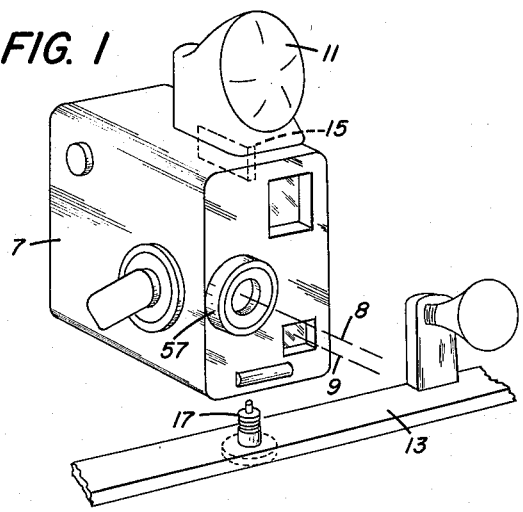
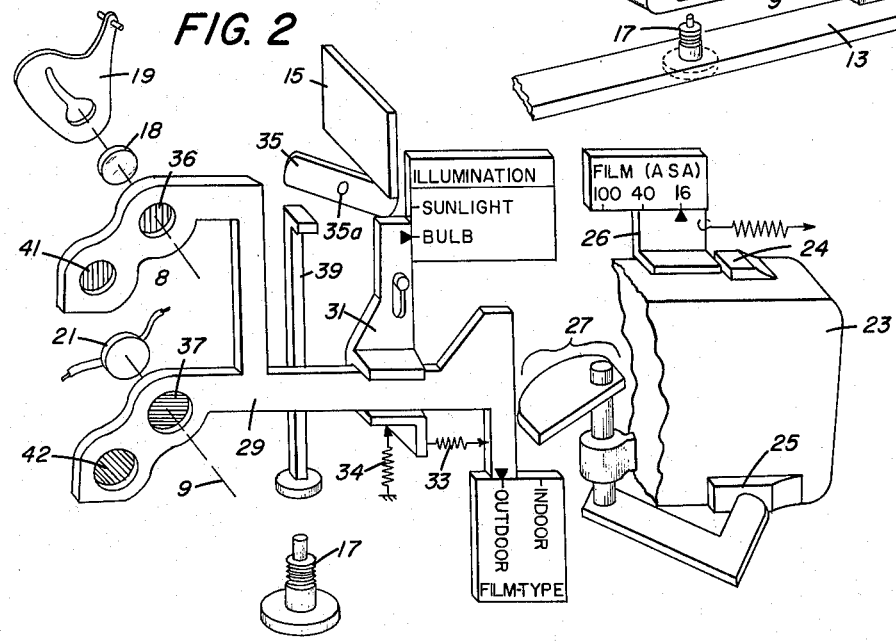
DONALD O. EASTERLY
DAVID L. BABCOCK
INVENTORS
BY
ATTORNEYS

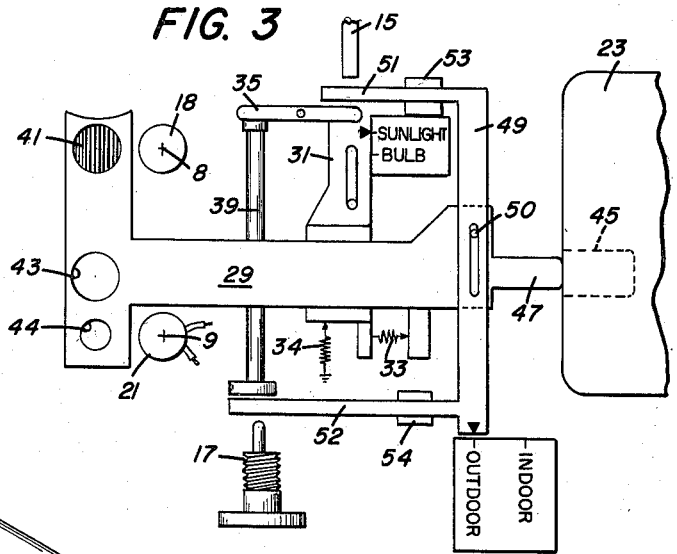
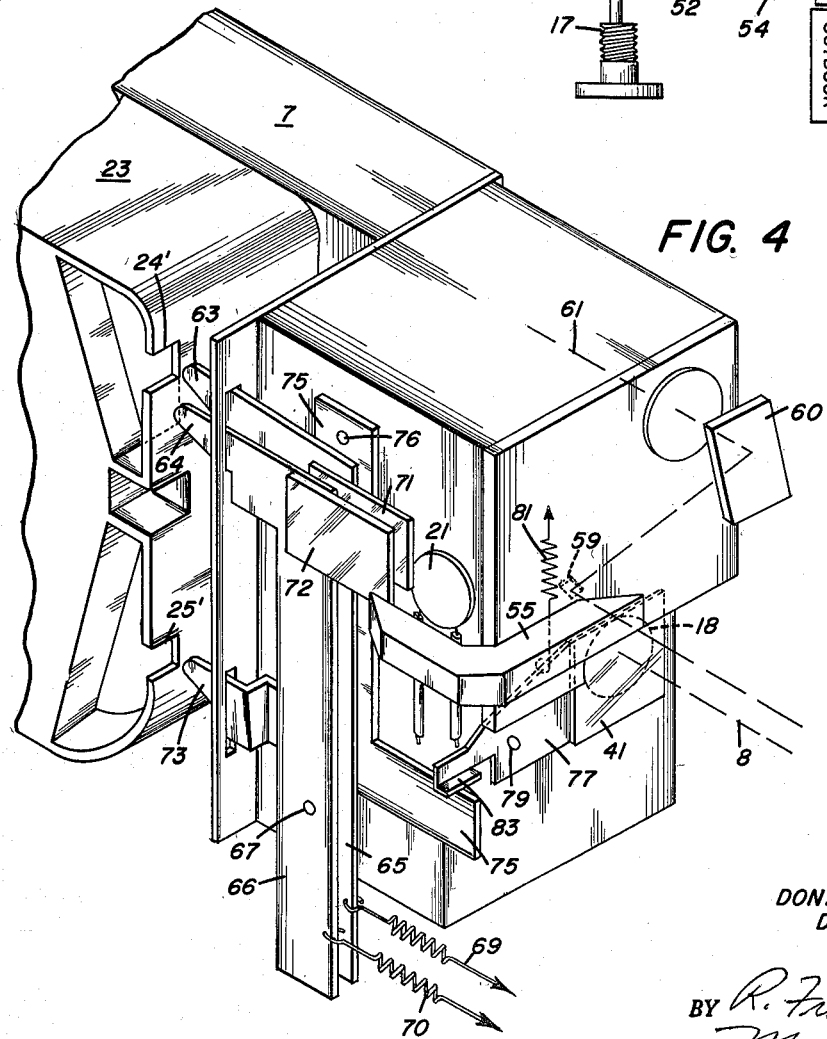

Sept. 28, 1965  D. O. EASTERLY ETAL  3,208,363
AUTOMATIC FILM SENSITIVITY COMPENSATION
Filed May 11, 1964  3 Sheets-Sheet 3

DONALD O. EASTERLY
DAVID L. BABCOCK
INVENTORS

BY

ATTORNEYS

United States Patent Office 3,208,363
Patented Sept. 28, 1965

3,208,363
AUTOMATIC FILM SENSITIVITY COMPENSATION
Donald O. Easterly and David L. Babcock, Rochester, N.Y., assignors to Eastman Kodak Company, Rochester, N.Y., a corporation of New Jersey
Filed May 11, 1964, Ser. No. 366,267
14 Claims. (Cl. 95—11)

This invention relates to cameras and, more particularly to automatic exposure control cameras in which adjustment is made automatically to correlate the spectral composition of film exposing light with the spectral sensitivity characteristics of the film being exposed therein.

This invention is an improvement over the filter compensation mechanism originally disclosed in the application of R. D. Anwyl, Serial No. 276,412, filed April 29, 1963, now Patent 3,676,599, and assigned to the same assignee. The Anwyl application just referred to discloses an automatic filter compensation system in which information encoded on a film magazine is used to condition both a filter mechanism and the camera's automatic exposure control system in accordance with the speed and spectral sensitivity characteristics of the film in the magazine. In accordance with the disclosure of the said Anwyl application, correct exposure and color balance is automatically assured when the camera operator moves a lighting condition input member to a predetermined position in accordance with the lighting conditions under which the film is to be exposed, i.e., "sunlight" or "artificial illumination."

The subject invention further automates this system by eliminating the necessity for any manual setting of the camera by the camera operator. According to the invention herein, the camera operator merely inserts a film magazine into the camera and information encoded on the magazine automatically sets the camera's exposure control system and its filter mechanism in an initial position for normal daylight photography. In the event that the operator wishes to expose film by means of artificial illumination, the camera is supplied with a compatible lighting unit which may be attached to the camera. The camera and the lighting unit are provided with mutually cooperating structural means which, when the unit is attached to the camera, alter the initial position of the filter mechanism and the camera's automatic exposure control system to compensate automatically for conditions of artificial illumination. When the artificial lighting unit is removed from the camera, the camera is automatically reconditioned for operation under daylight conditions.

According to the simplest and preferred embodiment of the invention herein, the mechanism includes only a single filter, namely, the filter necessary to alter the spectral composition of normal sunlight so that it conforms to the spectral sensitivity characteristics of Type A (indoor) Film. According to this embodiment, the attachment of the artificial lighting unit to the camera removes the filter from the picture-taking axis and compensates the camera's automatic exposure control system for the higher film speed characteristics of Type A Film when used with artificial illumination. However, since this particular embodiment does not provide filters for compensating Daylight Type Film for use with artificial illumination, when a magazine containing Daylight Type Film is loaded into the camera, blocking means responsive to information encoded on the majazine prevent attachment of artificial lighting units to the camera.

It is an object of this invention to provide a new and improved structure for simply and economically correlating the spectral characteristics of film exposing light with the spectral sensitivity of film being exposed in the camera.

Another object is to provide camera and artificial lighting unit structures which, whenever the unit is attached to the camera, automatically position color compensating filter units in the camera for correlating the spectral composition of film-exposing light with the spectral sensitivity characteristics of the film being exposed.

A further object is to provide a camera-film magazine-artificial lighting unit combination for automatically conditioning a camera's exposure control system and its filter control mechanism to correlate the spectral composition of film exposing light with the spectral sensitivity characteristics of the film being exposed and, at the same time, to compensate the camera's automatic exposure control system for (1) changes in film response occasioned by the particular type of illumination conditions under which pictures are being taken as well as for (2) any alteration in the intensity of film-exposing light resulting from the positioning of filters into and out of alignment with the camera's picture-taking axis.

A still further object is to provide structure which blocks the attachment of artificial lighting units to the camera whenever the film being exposed in the camera is of a type inappropriate for exposure by artificial illumination.

Other objects, purposes and characteristic features of the present invention will be in part obvious from the accompanying drawings and will be in part pointed out as the description of the invention progresses. In describing the invention in detail, reference will be made to the accompanying drawings in which like reference characters indicate corresponding parts throughout the several views, and in which:

FIG. 1 illustrates a camera and lighting unit combination adapted for use in accordance with the invention herein;

FIG. 2 is a schematic diagram of a magazine-conditioned automatic exposure control system and filter compensation mechanism adapted to be further conditioned automatically by the attachment of artificial lighting units to the camera;

FIG. 3 is a schematic diagram of a simplified system in which the filter compensation unit is adapted for use only with Type A Film, and in which, when the camera is loaded with Daylight Type Film, blocking means are provided to prevent the attachment of artificial lighting units to the camera;

FIGS. 4 and 5 are details of a camera adapted in accordance with the invention herein, certain portions of the camera being omitted from each of the figures to facilitate understanding of the mechanism as shown.

Figure 5:
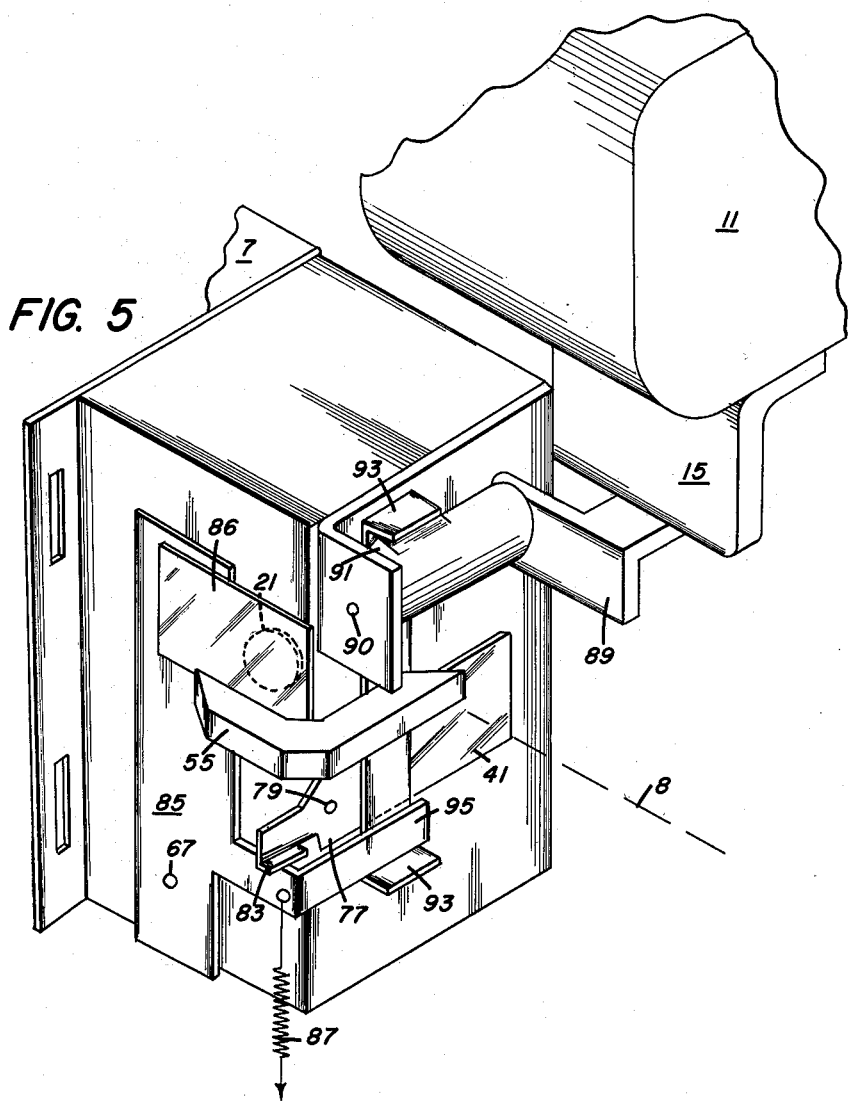

Referring now to FIG. 1, camera 7 is adapted to expose film by light received along picture-taking axis 8 in alignment with which are a conventional lens and shutter system as well as an automatic exposure control diaphragm which is varied as a function of the light impinging on a photocell mounted in alignment with optical axis 9. (It is noted at this time that in the particular embodiment illustrated in FIGS. 4 and 5, optical axis 9 is dispensed with and a photocell regulating the camera's automatic exposure control system is internally mounted, receiving its illumination from reflected light entering along the camera's picture-taking axis 8.) Light gun 11 and light bar 13 are well known units adapted for use with cameras to provide artificial illumination. Connecting link 15 attached to unit 11 and screw 17 attached to light bar 13 are used to attach the respective units to the camera.

FIG. 2 illustrates in schematic form the automatic system used to control exposure in the camera illustrated in FIG. 1. In line with picture-taking axis 8 are lens 18, automatically controlled diaphragm vane 19, and the camera's shutter mechanism (not shown). On separate optical axis 9 is mounted photocell 21, the output of which varies with the intensity of scene light and regulates the position of diaphragm vane 19 to automatically control exposure of film in the manner well known in the art.

The camera is loaded with film magazine 23 which is provided with structural modifications 24 and 25 having predetermined conformations which are representative, respectively, of the speed and type (spectral sensitivity) characteristics of the film contained therein. Structural modificaiton 24 cooperates with slide 26 in the camera to automatically condition the camera's automatic exposure control system in accordance with the film speed characteristics of the film in magazine 23 in a manner well known in the art, while structural modification 25 cooperate with bell crank-cam unit 27 to initially position filter unit 29 in accordance with the type of film in magazine 23.

Filter unit 29 is mounted for horizontal movement in a channelled portion of lighting condition input slide 31, filter unit 29 and input slide 31 being normally biased, respectively, to the right and upwardly by springs 33 and 34. It is the positioning of slide 31 which provides the filter and exposure control mechanism with the necessary input relating to the lighting conditions under which the film is to be exposed. As shown in FIG. 2, filter unit 29 has been moved to the left against the bias of spring 33 by bell crank-cam unit 27, the latter having been positioned by structural modification 25 upon the loading of film magazine 23 into the camera, thereby initially conditioning the camera for operation with Daylight (outdoor) Type Film. With Daylight Type Film loaded in the camera, and under conditions of normal sunlight illumination, an artificial lighting unit is not attached to the camera and filter unit 29 is normally carried in its uppermost position under the bias of spring 34, in which position filters are not aligned with either picture-taking axis 8 or photocell optical axis 9. However, when the camera operator desires to take the pictures with artificial illumination and attaches light gun 11 to camera 7 for this purpose, connecting link 15 of light gun 11 cooperates with lever arm 35 to drive input slide 31 against the bias of spring 34 to the lower position as illustrated in FIG. 2. This automatically aligns filters 36 and 37 with respective optical axes 8 and 9, filter 36 being designed to correlate the spectral composition of film-exposing light passing through lens 18 with the daylight sensitivity of the film in magazine 23, while neutral density filter 37 attenuates the exposure of photocell 21 to compensate the camera's automatic exposure control system for the light loss occasioned by the introduction of filter 36.

It should be noted that the same result occurs in the event that light bar 13 is attached by means of screw 17 to the camera, lever arm 35 being moved about pivot point 35a by the upward movement of shaft 39 when the latter is driven upwardly by the attachment of screw 17 to the camera.

When Type A (indoor) Film is carreid in magazine 23, the conformation of structural modification 25 is a recess which permits bell crank-cam unit 27 to rotate counterclockwise, and filter unit 29 moves under the influence of spring 33 to its righthand position, aligning filters 41 and 42 with respective optical axes 8 and 9, for daylight operation. Filter 41 is a color correcting filter used to correlate the spectral composition of reflected sunlight passing through lens 18 with the spectral sensitivity characteristics of the Type A Film being exposed, while neutral density filter 42 alters the intensity of the light impinging on photocell 21 to compensate the automatic exposure control system for the light loss occasioned by the use of filter 41.

Since the Type A Film is specifically manufactured to be exposed under the conditions of artificial illumination, when filter unit 29 is initially positioned as just described in response to the insertion of a magazine carrying Type A Film and either light unit 11 or 13 is attached to camera 7, connecting link 15 or screw 17 causes rotation of lever 35 in the manner described above driving input slide 31 against the bias of spring 34 to the position shown in FIG. 2. This moves unit 29 and filters 41 and 42 out of alignment with respective optical axes 8 and 9 permitting the Type A Film to be exposed by the artificial illumination for which it is specifically balanced.

In order to minimize costs of manufacture while retaining the basic elements of the automatic compensation system described above, it may be preferred to apply filter compensation only for one particular type of film. FIG. 3 shows in schematic form the general system just described as modified to provide such limited compensation. According to this modification, filter unit 29 carries only a single compensating filter 41 and, in lieu of neutral density filter 42, is provided with Waterhouse stops 43 and 44 which appropriately alter the exposure of photocell 21 when the filter unit is moved into and out of alignment with optical axes 8 and 9. When film magazine 23 carries Type A (indoor) Film, it is appropriately recessed at 45 to receive sensing finger 47 of filter unit 29, which permits filter unit 29 to be moved under spring 33 to its right-hand position. Under these conditions, the mechanism operates in the same general manner as the embodiment in FIG. 2 which is described above, filter 41 and Waterhouse stop 44 being moved out of alignment with respective optical axes 8 and 9 whenever connecting link 15 of light bar 13 or screw 17 of light bar 13 causes input slide 31 to be moved in a downward direction against the bias of spring 34.

However, in the event that film magazine 23 contains Daylight Type Film, magazine 23 is not recessed at 45 and when magazine 23 is inserted into the camera the casing of magazine 23 acts on sensing finger 47 to move slide 29 to the position illustrated in FIG. 3. A blocking element 49 is attached to filter unit 29 by means of pin 50 and has two arms 51 and 52 which are slidably engaged in channels 53 and 54. Thus, when a magazine containing Daylight Type Film is loaded into the camera the mechanism takes the position shown in FIG. 3 and arms 51 and 52 of blocking element 49 are positioned to prevent the insertion of connecting link 15 or screw 17 of the lighting units, warning the operator that the film is incompatible for exposure under conditions of artificial illumination.

FIGS. 4 and 5 illustrate in perspective the same view of a camera-film magazine-light unit combination in accordance with the invention herein, certain parts being omitted from each of the views to facilitate understanding of the embodiment illustrated. In this embodiment, photocell 21 is mounted internally and is not exposed by light entering the camera on an independent optical axis. Instead, photocell 21 is exposed by light passing along the picture-taking axis 8 and deflected to photocell 21 by means of a plastic periscope or light pipe 55. It should be noted that periscope 55 is positioned so that its light receiving end lies near the top of lens 18, and this position, in conjunction with lens shield 57 (see FIG. 1), limits the exposure of photocell 21 to skylight, thereby reducing the possibility of subject failure due to excessive backlighting.

Behind lens 18 and generally in line with optical axis 8 is reflex mirror 59 which, in association with reflex mirror 60, diverts a portion of the incoming light beam not otherwise used for film exposure to the camera viewfinder along optical axis 61.

According to this embodiment film is loaded into camera 7 by means of cassette 23 which is provided with structural modification in the form of recesses 24' and 25', recess 24' varying in size in accordance with the film speed and recess 25' being used to differentiate Daylight from Type A (indoor) Film. Recess 24' cooperates with sensing fingers 63 and 64 of respective photocell masking levers 65 and 66 which are mounted for rotational movement about pin 67. Whenever the portion of recess 24' cooperating with either finger 63 or 64 is not cut out (as shown by the casing area marked with a dotted line), the front end of cassette 23 abuts the sensing finger and causes its respective masking lever to move clockwise about pin 67 against the bias of its respective spring 69 or 70, moving respective neutral density filters 71 or 72 between the light delivering end of periscope 55 and photocell 21. It can thus be seen that in accordance with the size of code recess 24', the camera's automatic exposure control system is automatically adjusted in accordance with the speed of the film contained in magazine 23 by the introduction of either one, both, or neither of the neutral density filters 71 and 72. In the situation illustrated in FIG. 4, when film magazine 23 is fully inserted into camera 7, sensing finger 63 would be allowed to pass through recess 24', while sensing finger 64 would be abutted by the face of magazine 23, forcing masking lever 66 to move in a clockwise direction about pin 67 against the bias of spring 70 and, thus, compensating the camera's exposure control system for the particular speed of the film carried by magazine 23 by the introduction of neutral density filter 72 between the light delivering end of periscope 55 and photocell 21.

Similarly, recess 25' is indicative of the type (spectral sensitivity) of film carried by magazine 23, its presence indicating Type A Film and its absence indicating Daylight Type Flm. Sensing finger 73 of filter control lever 75 cooperates with magazine 23 so that, in the event that the camera is carrying Daylight Film and recess 25' is omitted, the casing of the magazine 23 presses against sensing finger 73 and causes filter cotrol lever 75 to move counterclockwise about its pin 76.

Color balancing filter 41 is attached to one end of lever 77 which is pivoted about pin 79 and normally held in covering relation to lens 18 by the bias of spring 81. However, whenever Daylight Film is carried by magazine 23, filter control lever 75 is rotated in the manner just described and acts on ear 83 of lever 77, causing lever 77 to rotate in a clockwise direction against the bias of spring 81 to move filter 41 out of alignment with picture-taking axis 8.

Referring now to FIG. 5, also mounted for rotational movement about pin 67 in a third photocell masking lever 85 which carries neutral density filter 86. The bias of spring 87 normally holds filter 86 as shown, between the light-delivering end of periscope 55 and photocell 21.

Whenever light gun 11 is attached to camera 7, its connecting link 15 cooperates with bell crank 89 to rotate bell crank 89 about its axis 90 and cause cam portion 91 of bell crank 89 to move slide 93 in an upward direction. The upward movement of slide 93 acts on arm 95 of masking lever 85 to cause that lever to rotate in a counter-clockwise direction about pin 67. This removes neutral density filter 86 from between photocell 21 and the light-delivering end of periscope 55 and, at the same time, causes arm 95 to act on ear 83 of filter lever 77, rotating lever 77 in a counterclockwise direction about its pin 79 to move color balancing filter 41 out of alignment with picture-taking axis 8. In this manner, when cassette 23 carries Type A Film and is loaded into camera 7, the camera is automatically set for daylight exposures by the presence of color balancing filter 41 in alignment with picture-taking axis 8 and the presence of neutral density filter 86 in front of photocell 21. However, when light gun 11 is attached to the camera in the manner just described above, color balancing filter 41 is removed and at the same time the camera's automatic exposure control system is automatically compensated for the removal of filter 41 by the movement of neutral density filter 86 out of its covering relation to photocell 21, automatically setting the camera for proper exposure with artificial illumination.

It should be noted that camera 7 may be provided with manual means for moving input slide 31 (FIGS. 2 and 3) or bell crank 89 (FIG. 5) for conditioning the camera for artificial illumination in the event non-compatible lighting units are used. Also, the operator may be provided with screw 17 or a "key" fashioned in the form of connecting link 15 to accomplish this same purpose.

It can be seen from the above, that the invention herein provides a fully automatic filter compensation system which requires nothing more on the part of the camera operator than that he load a film magazine into his camera and add an artificial lighting unit to the camera whenever he is going to use artificial illumination, removing the light unit from the camera whenever he is going to expose pictures under normal sunlight conditions. Thus, with merely these two simple acts on the part of the camera operator, the camera disclosed herein is capable of fully compensating for changes in scene illumination by correlating the spectral composition of film exposing light with the spectral sensitivity of the film being exposed, and, at the same time, fully compensating the camera's exposure control system for the changes in light intensity occasioned by the introduction or removal of any required filters.

Although the invention herein has been described in terms of its adaptation to movie cameras having automatic exposure control, attention is called to the fact that the novel cooperation of an artificial light unit with an adjustable filter mechanism as disclosed herein is equally adaptable to still cameras and cameras without automatic exposure control to provide automatic correlation of the spectral composition of film exposing light with the spectral sensitivity characteristics of the film being exposed. Also in this regard, it should be understood that the embodiments disclosed have been chosen with the purpose of facilitating disclosure rather than to limit the number of forms the invention may take and that modifications and alterations of the specific embodiments disclosed may be made to meet the requirements of practice without departing from the spirit or scope of the following claims.

What is claimed is:

1. In combination, a camera having a picture-taking axis and adapted to receive and expose film of a predetermined spectral sensitivity, a unit for producing artificial illumination, filter means positionable into and out of alignment with said picture-taking axis for altering the spectral composition of film-exposing light passing along said axis, and mutually cooperating structural means on said camera and said unit for (a) interconnecting said unit with said camera and for (b) positioning said filter means, when the unit and camera are so interconnected, to correlate the spectral composition of said film-exposing light with said spectral sensitivity of said film.

2. In a camera and a unit for producing artificial illumination, said camera being adapted to receive and expose film of a predetermined spectral sensitivity and having filter means movable into and out of alignment with the picture-taking axis of said camera for altering the spectral composition of film-exposing light passing along said axis to correlate said spectral composition of said film-exposing light with said spectral sensitivity of said film, said filter means being normally biased to a first position relative to said axis when said film is to be exposed by light from a scene illuminated principally by sunlight and being movable to a second position relative to said axis when said film is to be exposed by light from a scene illuminated principally by artificial light, the improvement comprising: mutually cooperating structural means on said camera and said unit for interconnecting said unit with said camera and for moving said filter means to said second position when said unit is interconnected with said camera.

3. In a camera and a unit for producing artificial illumination, said camera having (a) first means selectively positionable to any one of a plurality of settings indicative of the spectral sensitivity of film to be exposed therein, (b) lighting condition input means selectively positionable to any one of a plurality of settings indicative of the spectral characteristics of scene illumination, and (c) filter means movable into and out of alignment with the picture-taking axis of said camera for altering the spectral composition and intensity of film-exposing light passing along said axis, said filter means being moved to an initial position by said first means, the improvement comprising: mutually cooperating structural means on said camera and said unit for interconnecting said unit with said camera and for selectively positioning said lighting condition input means to a predetermined setting whenever said unit is interconnected with said camera, said filter means being responsive to said setting of said input means for movement to a final position correlating the spectral composition of said film-exposing light with the spectral sensitivity of said film.

4. The combination according to claim 3 wherein said camera also includes (d) exposure-determining means controlled as a function of the output of a photoresponsive device positioned to be exposed to scene light and (e) means movable to any one of a plurality of distinctive settings for regulating the output of said photoresponsive device, further comprising: means interconnecting said filter means and said regulating means, said interconnecting means being responsive to the movement of said filter means to said final position in response to the setting of said lighting condition input means for selectively moving said regulating means to one of said distinctive settings to regulate the output of said photoresponsive device in accordance with said alteration of intensity of said film-exposing light.

5. The combination according to claim 3 further including film carrying means adapted for insertion into said camera and having structural means thereon of preselected conformation representative of the spectral sensitvity of film carried thereby, and wherein said first means is responsive to said structural means on said film carrying means and moves said filter means to said initial position following insertion of said film carrying means into said camera.

6. The combination according to claim 3 wherein said filter means includes a plurality of filters.

7. The combination according to claim 3 further comprising blocking means responsive to said first means and movable into blocking relation to said mutually cooperating structural means on said camera to prevent interconnection of said lighting unit and said camera when said first means is positioned at a predetermined setting indicative of a film sensitivity incompatible for exposure under conditions of artificial illumination.

8. In a camera adapted to receive and expose film of a predetermined spectral sensitivity, said camera having a picture-taking axis and including means for cooperating with structural means on an artificial lighting unit to interconnect said unit and said camera, the improvement comprising: filter means positionable into and out of alignment with said picture-taking axis for altering the spectral composition of film-exposing light passing along said axis, and means cooperating with said structural means on said artificial lighting unit when said unit is interconnected with said camera for positioning said filter means to correlate the spectral composition of said film-exposing light with said spectral sensitivity of said film.

9. A camera according to claim 8 wherein said filter means is normally biased to a first position relative to said axis when said film is to be exposed by light from a scene illuminated principally by sunlight and is movable to a second position relative to said axis when said film is to be exposed by light from a scene illuminated principally by artificial light, said cooperating means moving said filter means to said second position when said artificial lighting unit is interconnected with said camera.

10. In a camera having means for cooperating with structural means on an artificial lighting unit to interconnect said unit and said camera, said camera having (a) first means selectively positionable to any one of a plurality of settings indicative of the spectral sensitivity of film to be exposed therein, (b) lighting condition input means selectively positionable to any one of a plurality of settings indicative of the spectral characteristics of scene illumination, and (c) filter means movable into and out of alignment with the picture-taking axis of said camera for altering the spectral composition and intensity of film exposing light passing along said axis, said filter means being moved to an initial position by said first means, the improvement comprising: means cooperating with said structural means on said artificial lighting unit when said unit is interconnected with said camera for selectively positioning said lighting condition input means to a predetermined setting, said filter means being responsive to said setting of said input means for movement to a final position correlating the spectral composition of said film-exposing light with the spectral sensitivity of said film.

11. A camera according to claim 10 wherein said camera also includes (d) exposure-determining means controlled as a function of output of a photoresponsive device positioned to be exposed to scene light and (e) means movable to any one of a plurality of distinctive settings for regulating the output of said photoresponsive device, further comprising: means interconnecting said filter means and said regulating means, said interconnecting means being responsive to the movement of said filter means to said final position in response to the setting of said lighting condition input means for selectively moving said regulating means to one of said distinctive settings to regulate the output of said photoresponsive device in accordance with said alteration of intensity of said film-exposing light.

12. A camera according to claim 10 further including means for receiving film carrying means having structural modifications thereon of preselected conformation representative of the spectral sensitivity of film carried thereby, and wherein said first means is responsive to said structural modifications on said film carrying means for moving said filter means to said initial position when said film carrying means is inserted into said camera.

13. In an artificial lighting unit including connecting means for cooperating with means on a camera adapted to receive and expose film of a predetermined spectral sensitivity to interconnect said unit and said camera, said camera having a picture-taking axis and including filter control means for positioning a filter into and out of alignment with said picture-taking axis to alter the spectral composition of film-exposing light passing along said axis, the improvement comprising: structural means on said lighting unit for cooperating with said filter control means in said camera when said unit is interconnected with said camera for positioning said filter to correlate the spectral composition of said film-exposing light with said spectral sensitivity of said film.

14. A device for interconnecting an artificial lighting unit and a camera adapted to receive and expose film of a predetermined spectral sensitivity, said camera having (a) structural means for receiving an artificial lighting unit, (b) a picture-taking axis, and (c) filter control means for positioning a filter into and out of alignment with said picture-taking axis to alter the spectral composition of film-exposing light passing along said axis, said device comprising: first means for attaching said device to said artificial lighting unit, and second means for cooperating with said structural means on said camera for interconnecting said camera and said artificial lighting unit, said second means also cooperating with said filter control means in said camera for positioning said filter to correlate the spectral composition of said film-exposing light with said spectral sensitivity of said film.

References Cited by the Examiner

UNITED STATES PATENTS

| | | | |
|---|---|---|---|
| 2,975,693 | 3/61 | Ort | 95—64 |
| 2,999,443 | 9/61 | Miyauchi | 95—10 |
| 3,087,398 | 4/63 | Greger | 95—10 |

FOREIGN PATENTS

| | | |
|---|---|---|
| 1,269,463 | 7/61 | France. |
| 849,953 | 9/52 | Germany. |

JOHN M. HORAN, *Primary Examiner.*